March 24, 1925.

R. D. GIVEN ET AL 1,530,934

CONTROL OF DYNAMO ELECTRIC MACHINES

Filed June 5, 1923

Inventors:
Ralph D. Given,
Hugh W. C. Liddiard,
by Alexander D. Lunt
Their Attorney.

Patented Mar. 24, 1925.

1,530,934

UNITED STATES PATENT OFFICE.

RALPH DAVID GIVEN, OF LEAMINGTON, AND HUGH WILLIAM CONWAY LIDDIARD, OF RUGBY, ENGLAND, ASSIGNORS TO GENERAL ELECTRIC COMPANY, A CORPORATION OF NEW YORK.

CONTROL OF DYNAMO-ELECTRIC MACHINES.

Application filed June 5, 1923. Serial No. 643,529.

*To all whom it may concern:*

Be it known that we, RALPH DAVID GIVEN and HUGH WILLIAM CONWAY LIDDIARD, subjects of the King of Great Britain, residing, respectively, at Leamington and at Rugby, in the county of Warkick, England, have invented certain new and useful Improvements in Control of Dynamo-Electric Machines, of which the following is a specification.

In electrical equipments comprising a direct current motor and generator with Ward Leonard control driven by an electric motor, steam turbine or other suitable prime mover, it is desirable to maintain the speed of the direct current motor constant irrespective of speed changes in the generator. It is particularly necessary to maintain this constant speed in the case of rolling mill and hoisting equipments in which the energy stored in the rotating parts of the generator set, usually a heavy fly wheel, is utilized to assist the generator during peak loads.

The present invention relates to equipments of this kind and more particularly to cases in which the exciters for the supply of field current to the main motor and to the generator are directly coupled to the generating set and therefore vary in speed along with the latter.

Figure 1:
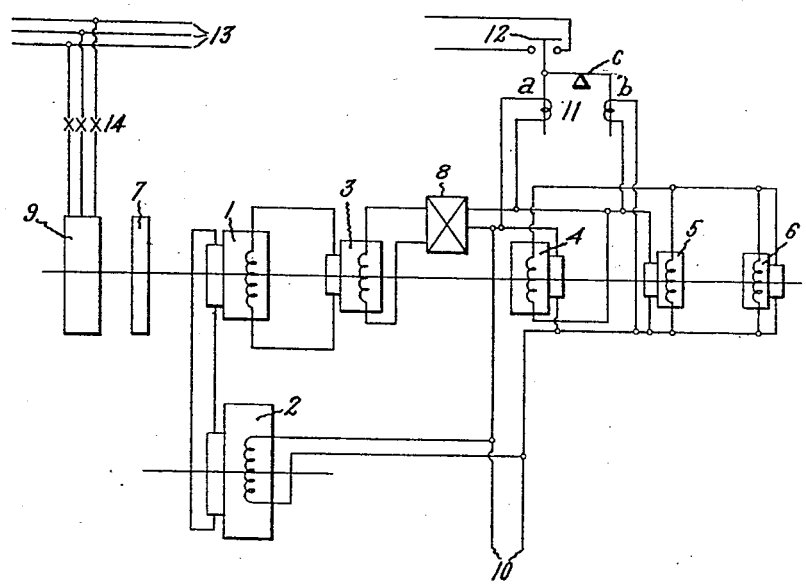
Figure 2:
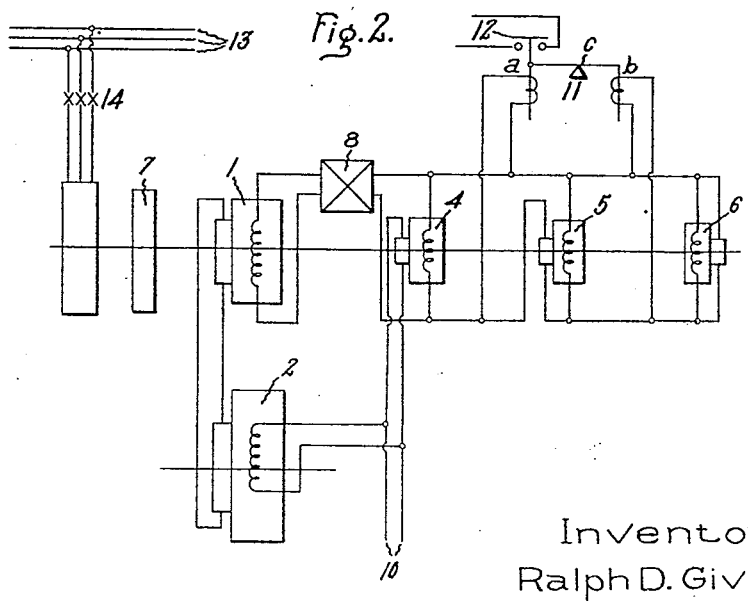

In the accompanying drawing, Figure 1 is a very simplified diagram of a Ward Leonard control system in accordance with the invention, and Figure 2 is a very simplified diagram of a modification of the arrangement of Figure 1.

Referring to Fig. 1, a generator 1 is driven in any suitable manner as for example by a steam turbine. A main motor 2 is coupled to a hoisting machine for example. The supply of field current to the generator is provided with an exciter 3, and the field current to the motor is provided by an exciter 4. Small generators 5 and 6 provide field current to the exciters 3 and 4 as described below. A fly wheel 7 is provided which gives up part of its energy to assist in driving the generator when the speed of the set drops during peak loads on the main motor. A controller 8 varies the field strength of exciter 3 and thus the field strength of the generator on the well known Ward Leonard principle.

The operation of the equipment is as follows:

If the speed of the generating set drops 10% during a peak load; then in order to obtain constant speed of the main motor, the voltage at the field terminals must remain substantially constant, and also the voltage at the brush terminals must remain substantially constant. To accomplish this, taking the field volts to begin with, the voltage generated by exciter 4 must be substantially constant. The fields of exciters 3 and 4 are unsaturated, and hence if the speed drops 10% the voltage at the field terminals must be increased by 10% to increase the field current by the same amount. The latter current is supplied by machines 5 and 6 which act in opposition to one another.

Machine 6 is self-exciting, and practically saturated. It also supplies field current to machine 5 which is unsaturated. A drop of 10% in speed therefore drops the voltage of machine 6 by 10% approximately, and the field strength of machine 5 by 10%. Since the speed of 5 also dropped by 10% the voltage generated will drop by about 20%.

The voltage speed characteristic of machines 6 and 5 acting in opposition is a curve, since machine 6 follows a straight line law, and machine 5 a parabolic law. By selecting a suitable point on the curve, the slope is such that a 10% fall or rise in speed is accompanied by a 10% rise or fall in the voltage of the field supply to machine 4. Consequently, the voltage between busbars 10 remains practically constant. In the case of the generator, the field will likewise have to increase by 10% with a 10% drop in speed, and to do this the field of exciter 3 will require to increase by about 20%. This is brought about by connecting its field across machines 4 and 5 which act in opposition and whose combined characteristic is a curve. Voltage of machine 4 being constant, and of machine 5 a parabola with respect to the speed, by choosing a suitable point on the resultant curve, the slope is such that a 10% drop in speed is accompanied by a 20% increase in voltage in the current supply to the field of exciter 3.

Fig. 1 also shows machine 9 on the generator set. This machine is necessary to hold the speed of the generating set when the main motor is being driven by the machine to which it is coupled, as when lowering loads in the case of a hoist. Machine 2 then becomes a generator, and drives 1 as a motor and unless some checking device were used the latter would obtain a dangerous speed.

Fig. 1 shows machine 9 connected to 3 phase lines 13. The magnetically operated switch 14 is closed when the machine 9 reaches, or is slightly above, synchronous speed. To do this a relay 11 is employed. The relay has two coils $a$ and $b$ with cores connected to a cross arm $c$ hinged at the center, and the contact 12 of the relay controls a circuit for operating switch 14 in the well known manner. Coil $a$ is connected to the leads supplying the field of 3, and coil $b$ to the terminals of machine 5. The field of exciter 3 will have a voltage rise of 20% with a 10% drop in speed, and the exciter 5 a voltage drop of 20%. Consequently the balance of the relay 11 is very quickly changed with a slight alteration in speed, and it can be arranged to open 12 at synchronous speed, so that machine 9 is connected to the lines 13 at and above that speed, and behaves as a generator.

Alternatively, the machine 9 may be an alternator of the usual type, and the stator can be connected by means of a switch 14 to suitable resistances when braking is required, and the resistances may be connected permanently to the stator, and the rotor connected to the busbars 10 for excitation during braking, or machine 9 may be an eddy current brake. Those skilled in the art will readily understand the above mentioned alternative arrangements and therefore they are not illustrated in the drawing.

Fig. 2 shows a modification of the above scheme suitable for smaller equipments, in which it becomes practicable to control the field current of the generator 1 directly by means of a Ward Leonard controller in place of indirectly through the medium of the exciter as in Fig. 1. The field of motor 2 is obtained as before from busbars 10 but the field of the generator 1 is in parallel with the field of 4, this being already necessary since the voltage of the field 4 increases by 10% with a 10% drop in speed and this is the condition required in the field of 1 in order to maintain constant voltage at its terminals otherwise the description applying to Fig. 1 holds for Fig. 2 also. Machines 5 and 6 need not be separate units but may be combined with one unit having the same characteristics, as will be understood by those skilled in the art.

The constant voltage machine 4 can be used to supply any auxiliary motors in the equipment.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

What we claim as new and desire to secure by Letters Patent of the United States, is,—

1. The combination in a control system of a separately excited direct current motor, a separately excited direct current generator for supplying the armature current for said motor, and means for maintaining the voltages at the field terminals and at the armature terminals of said motor at substantially constant values, comprising an exciter connected to operate synchronously with the said generator for exciting the field of said motor, and auxiliary supply means connected to vary in voltage responsively to the speed of said generator for supplying the excitation of the said exciter and for controlling the excitation of said generator.

2. The combination in a control system of a separately excited direct current motor, a separately excited direct current generator for supplying the armature current for said motor, and means for maintaining the voltages at the field terminals and at the armature terminals of said motor at substantially constant values, comprising an exciter connected to operate synchronously with the said generator for exciting the field of said motor, and auxiliary supply means operated synchronously with the said generator and connected to vary in voltage inversely with the speed of said generator for supplying the excitation of said exciter and for controlling the excitation of said generator.

3. A control system for a direct current motor and generator each having an exciter coupled to the generating set, in which two auxiliary generators coupled to the generating set are arranged in opposition, so as to vary the voltage of the field supply to the exciter providing field current to the motor, in accordance with variations in speed of the generating set, to maintain the voltage on the field of the motor at a practically constant value, and in which one auxiliary generator and the exciter for the motor are arranged in opposition so as to vary the voltage of the field supply to the exciter for the generator field in accordance with variations in generator speed, to maintain the voltage on the generator field at a practically constant value.

4. The combination in a control system of a separately excited direct current motor, a separately excited direct current generator for supplying the armature current for said motor, means for maintaining the voltages at the field terminals and at the armature terminals of said motor at substantially constant values, comprising an exciter connected to operate synchronously with the said generator for exciting the field of said motor, auxiliary supply means connected to vary in voltage responsively to the speed of said generator for supplying the excitation of the said exciter and for controlling the excitation of said generator, and a dynamo electric machine mechanically connected to the said generator for preventing the speed thereof from rising above a predetermined value when the said motor acts as a generator.

5. The combination in a control system of a separately excited direct current motor, a separately excited direct current generator for supplying the armature current for said motor, means for maintaining the voltages of the field terminals and at the armature terminals of said motor at substantially constant values, comprising an exciter connected to operate synchronously with the said generator for exciting the field of said motor, auxiliary supply means connected to vary in voltage responsively to the speed of said generator for supplying the excitation of the said exciter and for controlling the excitation of said generator, a dynamo electric machine mechanically connected to the said generator, and means energized responsively to the speed of the generator for controlling the said dynamo electric machine to prevent the speed of the generator from rising above a predetermined value.

In witness whereof, we have hereunto set our hands this 18th day of May, 1923.

RALPH DAVID GIVEN.
HUGH WILLIAM CONWAY LIDDIARD.

Witnesses:
N. EDVEAN-LATHM,
J. A. FOSTER.